(12) United States Patent
Vorobyov et al.

(10) Patent No.: US 11,494,489 B1
(45) Date of Patent: Nov. 8, 2022

(54) SYNTHESIS OF DESERIALIZATION FILTERS FROM POSITIVE AND NEGATIVE EXAMPLES

(71) Applicant: Oracle International Corporation, Redwood Shores, CA (US)

(72) Inventors: Kostyantyn Vorobyov, Brisbane (AU); François Gauthier, Brisbane (AU); Sora Bae, Carindale (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 21 days.

(21) Appl. No.: 17/359,245

(22) Filed: Jun. 25, 2021

(51) Int. Cl.
  *G06F 21/56* (2013.01)

(52) U.S. Cl.
  CPC ............ *G06F 21/56* (2013.01); *G06F 21/563* (2013.01); *G06F 21/562* (2013.01); *G06F 21/566* (2013.01); *G06F 2221/033* (2013.01)

(58) Field of Classification Search
  CPC ...... G06F 21/56; G06F 21/562; G06F 21/563; G06F 21/566; G06F 2221/033
  See application file for complete search history.

(56) References Cited

U.S. PATENT DOCUMENTS

| | | | |
|---|---|---|---|
| 11,385,996 B1 * | 7/2022 | Bartling | G06F 21/53 |
| 2021/0026969 A1 * | 1/2021 | Hod | G06F 21/552 |

FOREIGN PATENT DOCUMENTS

| | | | | |
|---|---|---|---|---|
| CN | 103546369 A | * | 1/2014 | |
| CN | 108040074 A | * | 5/2018 | ............. G06N 20/00 |

OTHER PUBLICATIONS

Lang, K.J., "Random DFA's can be approximately learned from sparse uniform examples"; Proc. 5th Annual ACM Workshop on Computer Learning Theory, Jul. 1992, pp. 45-52 (pages).

Juill, H. et al., A Sampling-Based Heuristic for Tree Search Applied to Grammar Induction, Proc. National Conference on Artificial Intelligence and Innovative Applications of Artificial Intellence, pp. 776-783, Jul. 1998 (8 pages).

Garcia, P. et al., "Learning Automata Teams", Proc. International Colloguium on Grammatical Inference: Theoretical Results and Applications, vol. 6339 LNCS, pp. 52-65, Sep. 2010 (14 pages).

(Continued)

*Primary Examiner* — Jayesh M Jhaveri
(74) *Attorney, Agent, or Firm* — Ferguson Braswell Fraser Kubasta PC

(57) ABSTRACT

A method for detecting malicious code may include generating, from deserialization examples, a finite automaton including states. The states may include labeled states corresponding to the deserialization examples. A state may correspond to a path from a start state to the state. The method may further include while traversing the states, generating a state mapping including, for the state, a tracked subset of the states, determining that the path corresponds to a path type, inferring, using the path type and the state mapping, a regular expression for the state, and determining, for a new deserialization example and using the regular expression, a polarity indicating whether it is safe to deserialize the new deserialization example.

20 Claims, 11 Drawing Sheets

(56) References Cited

OTHER PUBLICATIONS

Lang, K.J. et al., "Results of the Abbadingo One DFA Learning Competition and a New Evidence-Driven State Merging Algorithm", Proc. International Colloguium on Grammatical Inference, vol. 1433 LNCS, Jul. 1998, pp. 1-12 (12 pages).
Oliveira, A.L. et al., "Efficient Algorithms for the Inference of Minimum Size DFAs"; Proc. Workshop on Automata Induction, Grammatical Inference, and Language Acquisition, Jul. 1997 (27 pages).
Coste, F. et al., "Regular Inference as a Graph Coloring Problem", Proc. Workshop on Automata Induction, Grammatical Inference, and Language Acquisition, Jul. 1997 (6 pages).
Oliveira, A.L. et al., "Limits of Exact Algorithms for Inference of Minimum Size Finite State Machines", Proc. International Workshop on Algorithmic Learning Theory, vol. 1160 LNCS, Oct. 1996, pp. 59-66 (8 pages).
Heule, M. et al., "Exact DFA Identification Using SAT Solvers", Proc. International Colloquium on Grammatical Inference: Theoretical Results and Applications, vol. 6339 LNCS, Sep. 2010, pp. 66-79 (14 pages).
Bartoli, A. et al., "Automatic Generation of Regular Expressions from Examples with Genetic Programming", Proc. Genetic and Evolutionary Computation Conference, ACM, Jul. 2012, pp. 1477-1478 (2 pages).
Aljawarneh, S.A. et al., "Investigations of Automatic Methods for Detecting the Polymorphic Worms Signatures", Future Generation Computer Systems, vol. 60, 2016, pp. 67-77 (11 pages).
Oncina, J. et al., "Inferring Regular Languages in Polynomial Updated Time", Advances in Structural and Syntactic Pattern Recognition, Jan. 1992 (7 pages).
Biermann, A.W. et al., "On the Synthesis of Finite-State Machines from Samples of their Behavior"; IEEE Transactions on Computers 21(6) Jun. 1972, pp. 592-597 (6 pages).
Haken, I., Automated Discovery of Deserialization Gadget Chains, Aug. 2018. http://i.blackhat.com/us-18/Thu-August-9/us-18-Haken-Automated-Discovery-of-Deserialization-Gadget-Chains-wp.pdf (45 pages).
Github, "Contrast-Security-OSS/Contrast-rO0, 2015"; Retrieved from the Internet Jul. 6, 2021. https://github.com/Contrast-Security-OSS/contrast-rO0 (6 pages).
Apache Commons, "Validating Object Input Stream, 2020"; Retrieved from the Internet Jul. 6, 2021. https://commons.apache.org/proper/commons-o/javadocs/api-2.5/org/apache/commons/io/serialization/validatingobjectinputstream.html (5 pages).
Bechler, M., "Serianalyzer, 2015"; Retrieved from the Internet Jul. 6, 2021. https://github.com/mbechler.serianalyzer (32 pages).
Carettoni, L., "Serial Killer, 2016"; Retrieved from the Internet Jul. 6, 2021. https://github.com/ikkisoft/SerialKiller.
Frohoff, C., "Ysoserial, 2015"; Retrieved from the Internet Jul. 6, 2021. https://github.com/frohoff/ysoserial (5 pages).

* cited by examiner

Positive
Deserialization
Examples
400 int
char
java.lang.String
java.lang.Short
java.nio.files.Path
java.nio.files.Files
java.util.Set
java.util.Map
java.time.Clock
java.time.Instant Negative
Deserialization
Examples
402 byte
java.lang.Runtime
java.lang.System
java.nio.Buffer
java.io.Writer
java.time.chrono.Era

FIG. 4A

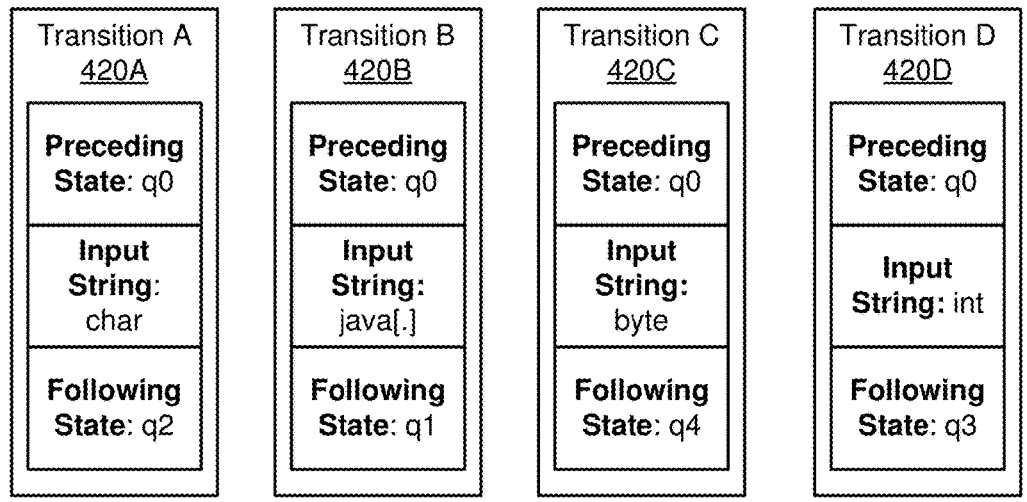
FIG. 4C
State Mapping 422
$q_0 \mapsto \{q_2, q_3, q_4\}$  $q_5 \mapsto \{q_{11}\}$
$q_6 \mapsto \{q_{12}, q_{13}, q_{14}, q_{15}\}$  $q_7 \mapsto \emptyset$
$q_8 \mapsto \{q_{18}, q_{19}\}$  $q_9 \mapsto \{q_{21}\}$
$q_{10} \mapsto \emptyset$  $q_{20} \mapsto \{q_{24}\}$
FIG. 4D
Regular Expression 424
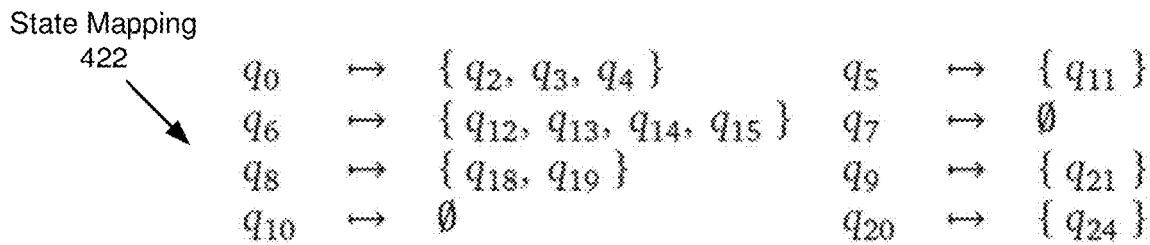
FIG. 4E

APTA B 410B

Transformed APTA B 420B

Effect of Raise Transformation for $S_+ = \{a.b.c, a.b.**\}$ and $S_- = \{a.b.*\}$

APTA C 410C

Transformed APTA C 420C

Effect of Trim Transformation for $S_+ = \{a.b.c.d, a.b.*, a.b.\}$ and $S_- = \{\}$ Pre (top) and Post (bottom) Transformation APTA with $S_+ = \{a., a.b.c., a.d.e\}$ and $S_- = \{a.b., a.b.c.*, a.d.**\}$.

SYNTHESIS OF DESERIALIZATION FILTERS FROM POSITIVE AND NEGATIVE EXAMPLES

BACKGROUND

Serialization is a mechanism that converts an object into a byte stream that can be saved into a file or transmitted over a network. For example, Java serialization is a widely used feature that plays an important role in the Java infrastructure. Deserialization is a mechanism that reconstructs an object from a byte stream. Deserialization of data generated by malicious sources may result in security breaches, including remote code execution exploits.

A typical way of protecting against insecure deserialization is to filter deserialization targets at runtime as either safe or unsafe based on the name of the deserialized class, and block the deserialization of objects from malicious classes. For example, Java deserialization filters may be enforced at runtime via the Java JDK Enhancement Proposal (JEP)-290 feature that enables filtering of incoming streams of object serialization data. A notable feature of JEP-290 is that in addition to enabling custom deserialization filters it is also possible to specify targets that are safe or not safe to deserialize using class name patterns with wildcards that match multiple class names.

Existing techniques for automated inference of regular expressions that match a class name if it is safe to deserialize based on examples of benign and malicious class names are not suitable for synthesis of deserialization filters. For example, such techniques may be either overly generic and produce regular expressions that match most examples or are too specific and only match examples that are syntactically very similar to positive examples. In addition, these techniques are often computationally expensive, and thus unscalable. Furthermore, existing approaches are limited to synthesis from concrete examples and cannot synthesize regular expressions from examples containing JEP290-style patterns with wildcards that describe multiple concrete examples.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for detecting malicious code including generating, from deserialization examples, a finite automaton including states. The states include labeled states corresponding to the deserialization examples. A state corresponds to a path from a start state to the state. The method further includes while traversing the states, generating a state mapping including, for the state, a tracked subset of the states, determining that the path corresponds to a path type, inferring, using the path type and the state mapping, a regular expression for the state, and determining, for a new deserialization example and using the regular expression, a polarity indicating whether it is safe to deserialize the new deserialization example.

In general, in one aspect, one or more embodiments relate to a system for detecting malicious code including a computer processor, a repository configured to store deserialization examples and a finite automaton including states. The states include labeled states corresponding to the deserialization examples. A state corresponds to a path from a start state to the state. The repository is further configured to store a state mapping including, for the state, a tracked subset of the states. The system further includes a deserialization filter generator executing on the computer processor and configured to generate, from the deserialization examples, the finite automaton, while traversing the states, generate the state mapping, determine that the path corresponds to a path type, infer, using the path type and the state mapping, a regular expression for the state, and determine, for a new deserialization example and using the regular expression, a polarity indicating whether it is safe to deserialize the new deserialization example.

In general, in one aspect, one or more embodiments relate to a method for detecting malicious code including generating, from deserialization examples, a finite automaton including states and a transitions each between a preceding state and a following state. The states include labeled states corresponding to the deserialization examples. The deserialization examples include one or more sub-package names and a class name. The deserialization examples include a subset of wildcard deserialization examples further including a wildcard. The method further includes generating a linear ordering of the deserialization examples, modifying, using the linear ordering, the transitions to obtain modified transitions, while traversing the states, generating a state mapping including, for a state, a tracked subset of the states, inferring, using the state mapping, a regular expression for the state, and determining, using the regular expression, a polarity for a new deserialization example indicating whether it is safe to deserialize the new deserialization example.

Other aspects of the invention will be apparent from the following description and the appended claims.

BRIEF DESCRIPTION OF DRAWINGS

FIG. 4A, FIG. 4B, FIG. 4C, FIG. 4D, and FIG. 4E show examples in accordance with one or more embodiments of the invention.

DETAILED DESCRIPTION

Figure 1A:
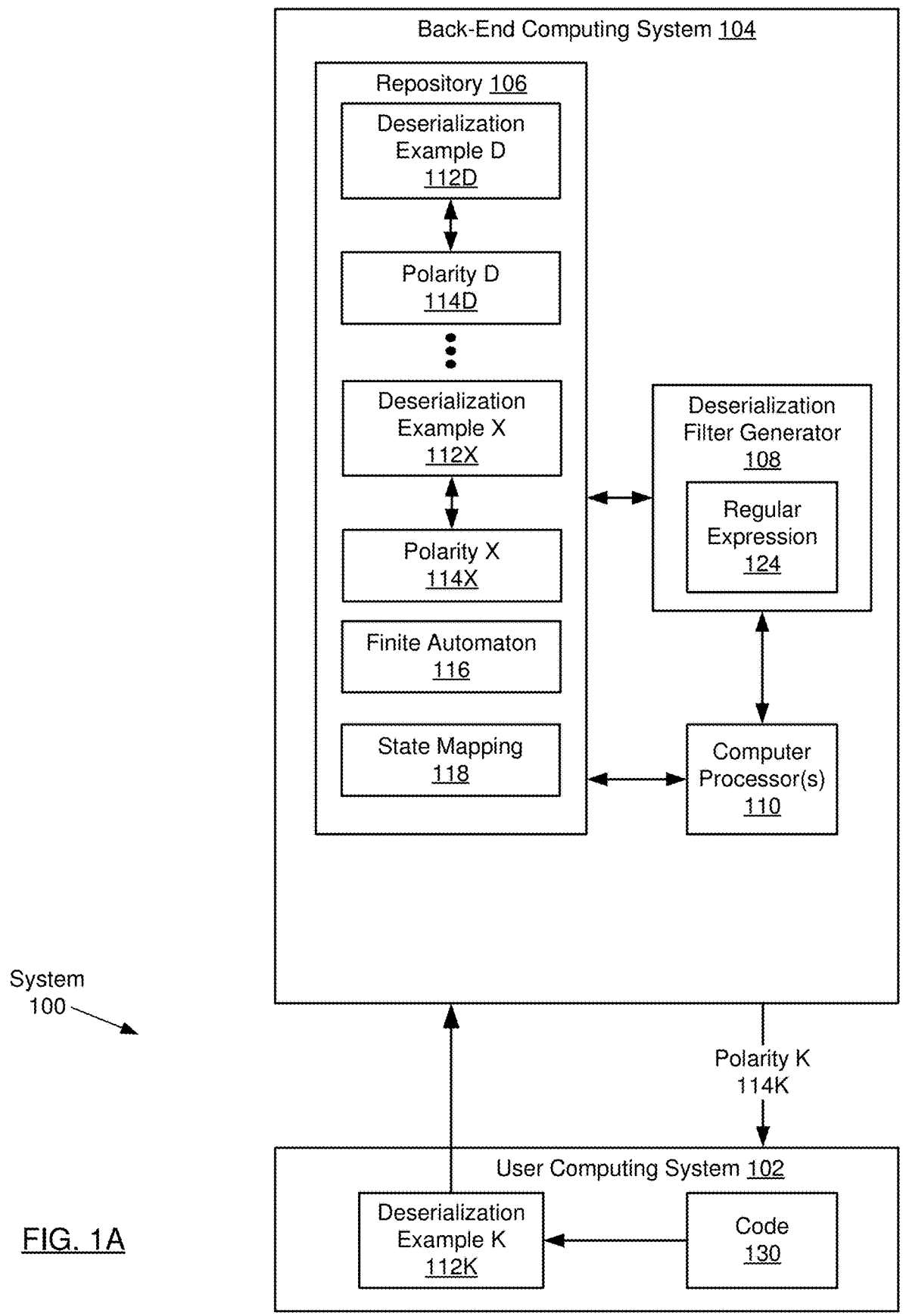
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention are directed to detecting malicious code. A finite automaton is generated from the deserialization examples. A deserialization example is a string including zero or more sub-package names and a class name. The states of the finite automaton include labeled states corresponding to the deserialization examples. The labeled states are labeled with the polarity of the corresponding deserialization example. The polarity is positive for benign deserialization examples and negative for malicious deserialization examples. In one or more embodiments, shortest paths to states labeled with positive polarity are generalized and combined to infer a regular expression. The regular expression may be inferred based on a path type of a path corresponding to a state. The path type is positive when the descendant labeled states of the state have a positive polarity. The path type is negative when the descendant labeled states of the state have a negative polarity. The path type is conflicting when one or more descendant labeled states of the state have a positive polarity and one or more labeled states of the state have a negative polarity. When the path type is conflicting, the regular expression is inferred by applying a conflict resolution heuristic. The polarity of a new deserialization example is determined by matching the regular expression to the new deserialization example. The new deserialization example may be generated dynamically, for example, while executing code or performing a static analysis of code. When the regular expression matches the new deserialization example, the polarity of new deserialization example is determined to be positive, and the new deserialization example is safe to deserialize.

In one or more embodiments, the deserialization examples include wildcards in order to generalize the deserialization examples. The inclusion of wildcards may result in multiple interpretations of overlapping deserialization examples that describe the same concrete deserialization examples. The multiple interpretations are resolved by imposing a linear ordering on the overlapping deserialization examples, such that successive deserialization examples in the linear ordering describe successively smaller subsets of concrete deserialization examples. The successive deserialization examples in the linear ordering have alternating polarity (e.g., a positive deserialization example is followed by a negative deserialization example). The linear ordering is used to modify the finite automaton to eliminate potential multiple interpretations due to overlapping deserialization examples.

FIG. 1A shows a system (100) in accordance with one or more embodiments of the invention. As shown in FIG. 1, the system (100) includes a user computing system (102) and a back-end computing system (104). In one or more embodiments, the user computing system (102) and the back-end computing system (104) take the form of the computing system (500) described with respect to FIG. 5A and the accompanying description below or take the form of the client device (526) described with respect to FIG. 5B. The back-end computing system (104) includes a repository (106), a deserialization filter generator (108), and computer processor(s) (110).

In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

Figure 1B:
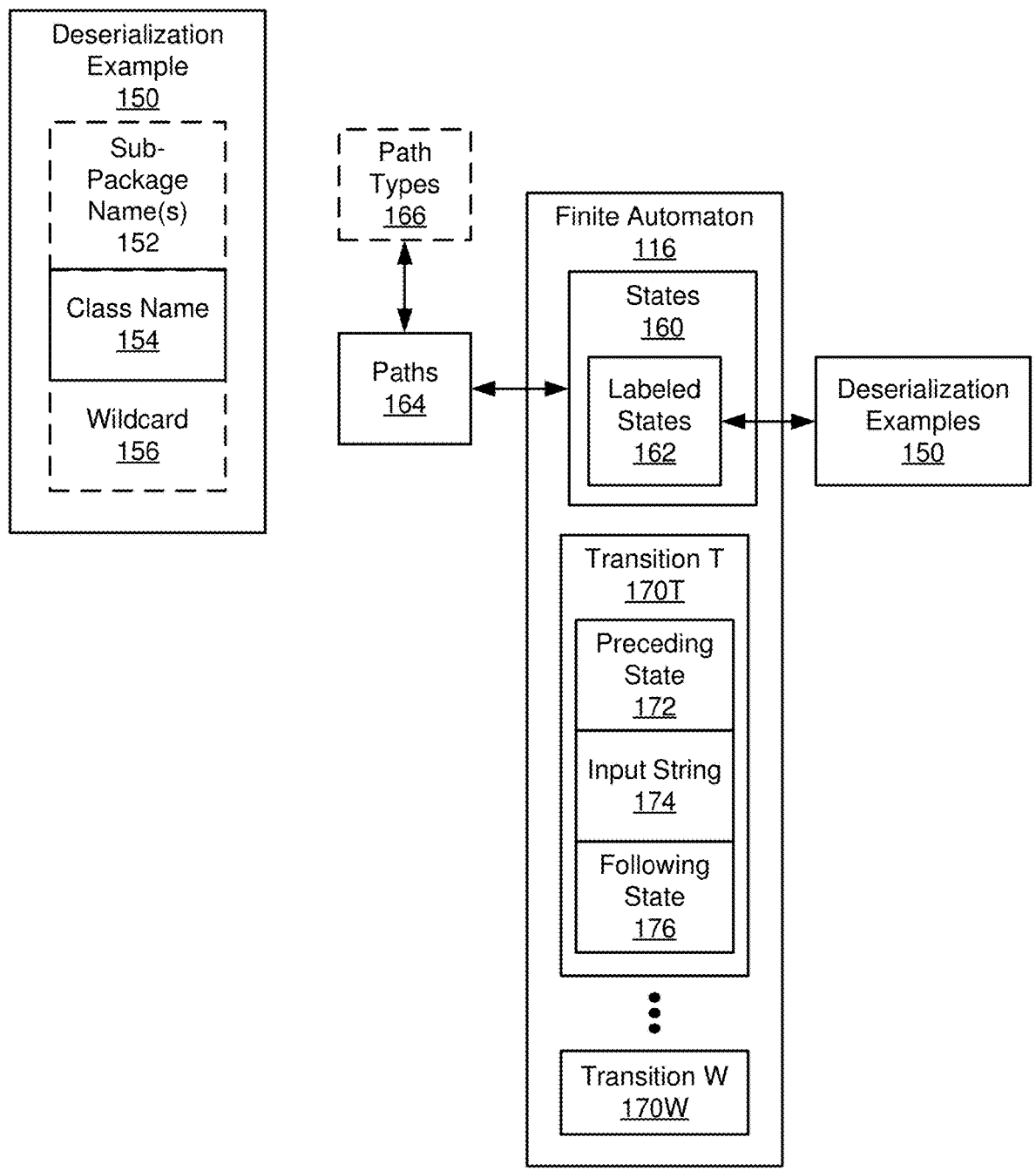

In one or more embodiments, the repository (106) includes functionality to store deserialization examples (112D, 112X), a finite automaton (116), and a state mapping (118). Turning to FIG. 1B, a deserialization example (150) is a string including, optionally, one or more sub-package names (152), a class name (154), and, optionally, a wildcard (156). A class name (154) is an identifier that identifies a class. A sub-package name (152) is an identifier that is a component of a package name. A package name identifies a group of classes, interfaces and/or other packages. For example, given a deserialization example java.lang.String, String is a class name, and Java and lang are sub-package names. The sub-package names may be separated from each other and from the class name by separators, such as the character '.'.

A wildcard (156) is an identifier that matches multiple class names. For example, the wildcard matches class names that follow a specific sequence of sub-package names. Continuing this example, the deserialization example a.b.* matches any class name following the sequence of sub-package names a.b. In other words, the deserialization example a.b.* matches any class name in the package whose package name is a.b. As another example, the wildcard '' matches class names following any sequence of sub-package names starting with a.b. Continuing this example, the deserialization example a.b. matches any class name in a package whose package name starts with a.b.

A deserialization example that includes a wildcard is called a wildcard deserialization example. A deserialization example that does not include a wildcard is called a concrete deserialization example.

Figure 1C:
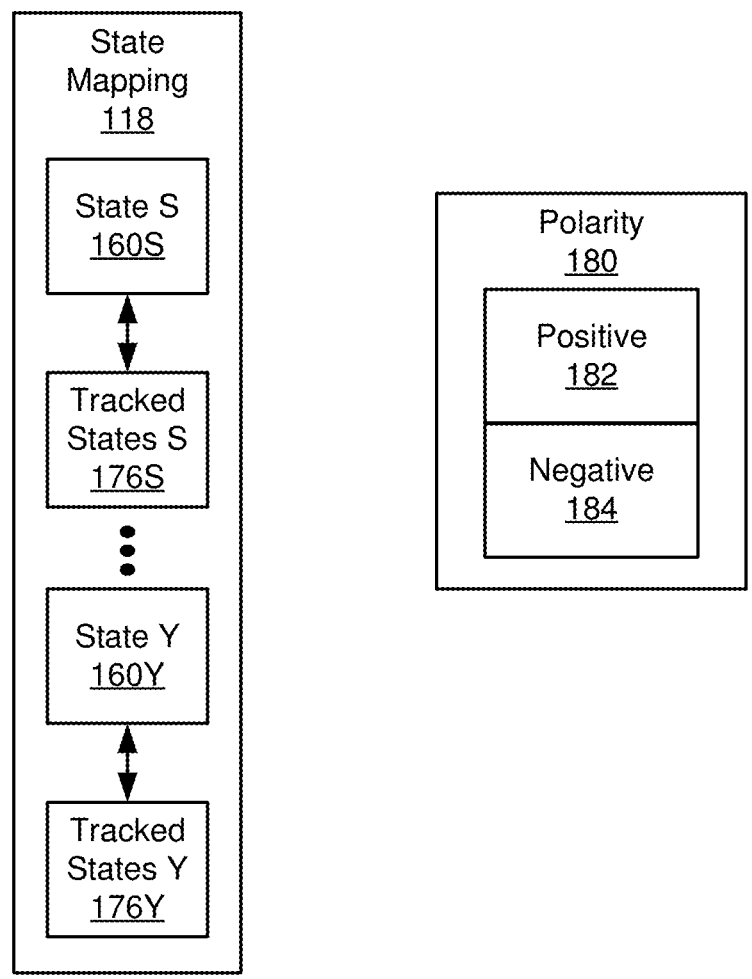

Returning to FIG. 1A, the deserialization examples (112D, 112X) are labeled with polarities (114D, 114X). Turning to FIG. 1C, a polarity (180) may be positive (182). A deserialization example (112D) labeled with a positive polarity is a positive (e.g., benign) deserialization example. In other words, a deserialization example (112D) labeled with a positive polarity is safe to deserialize. Alternatively, a polarity (180) may be negative (184). A deserialization example (112D) labeled with a negative polarity is a negative (e.g., malicious) deserialization example. In other words, a deserialization example (112D) labeled with a negative polarity is unsafe to deserialize.

A pair of wildcard deserialization examples are overlapping when the pair of deserialization examples describe the same concrete deserialization examples. For example, the wildcard deserialization examples a.b.** and a.b.c.* are overlapping because any concrete deserialization example from a.b.c.* is also included in a.b.** (e.g., because wildcard deserialization examples describe sets of strings). Overlapping deserialization examples may be represented using subset notation ⊂. Thus, for the example above, a.b.c.*⊂ a.b.. Overlapping deserialization examples may have multiple interpretations. For example, a positive wildcard deserialization example a. and a negative wildcard deserialization example a.* may be interpreted in two ways: 1) matching any class name or package name starting with a. except class names from the a package, and 2) matching any class name or package name starting with a. Potential ambiguities due to multiple interpretations may be resolved by giving higher precedence to smaller deserialization examples, where the size of a deserialization example is the number of strings described by the deserialization example. In other words, the polarity of a concrete deserialization example C described by multiple wildcard deserialization examples may be the smallest wildcard deserialization example that describes C. As an example, positive wildcard deserialization examples may include a. and a.b.c. and negative wildcard deserialization examples may include a.b.** and a.b.c.*. Although a concrete deserialization example C=a.b.c.d is included in (e.g., described by) both the positive wildcard deserialization examples and the negative wildcard deserialization examples, the polarity of C is negative because the smallest deserialization example that describes C is the negative wildcard deserialization example a.b.c.*. In this case, the wildcard deserialization example a.b.c.* is called the smallest enclosing example for C. In contrast, a concrete deserialization example C'=a.b.c.d.e has a positive polarity because the smallest enclosing example for C' is the positive wildcard deserialization example a.b.c.**.

Returning to FIG. 1B, a finite automaton (116) is a finite state machine that accepts or rejects finite strings of characters and produces a computation for each input string. The finite automaton (116) includes states (160) and transitions (170T, 170W). The states (160) include labeled states (162) corresponding to deserialization examples (150). Each labeled state (162) may be labeled with the polarity that labels the corresponding deserialization example (150). A labeled state labeled with a positive polarity is called an accepting state and a labeled state labeled with a negative polarity is called a rejecting state. The states (160) further include a start state and internal states. The internal states include any state that is neither one of the labeled states (162) nor the start state.

Figure 4B:
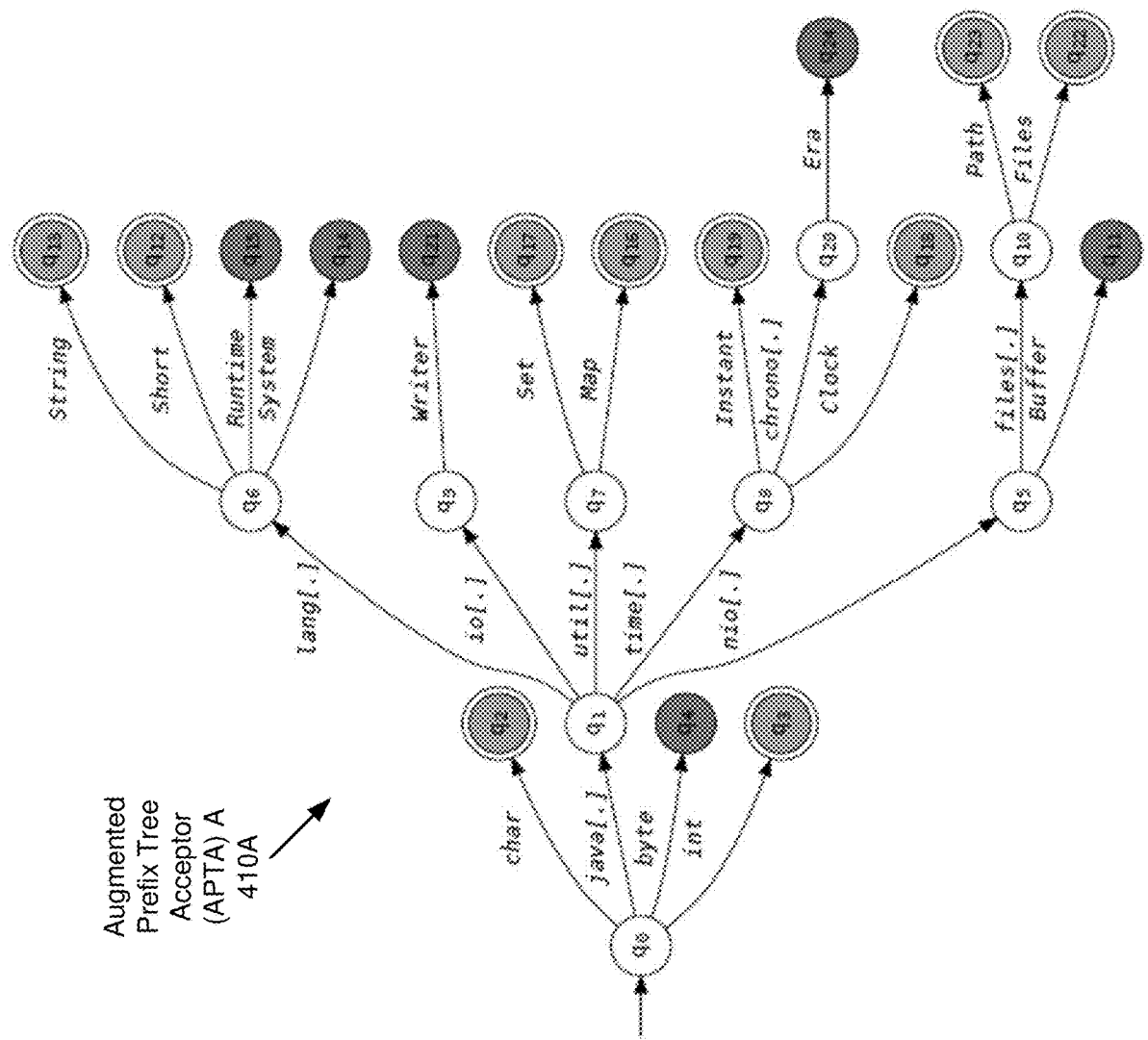

The finite automaton (116) may be an augmented prefix tree acceptor (APTA) whose states (160) and transitions (170T, 170W) form a tree. For example, FIG. 4B shows an APTA (410A) whose states are represented as circles and whose transitions are represented as arrows connecting pairs of states. Each transition (170T) includes a preceding state (172), an input string (174), and a following state (176). The transition (170T) indicates that when the finite automaton (116) is in the preceding state (172) and receives the input string (174), the finite automaton (116) enters the following state (176). Continuing the above example, FIG. 4B shows that when the APTA (410A) is in the start state $q_0$ and receives the input string "char," the APTA (410A) enters the labeled state $q_2$.

A state S may have one or more descendant states. Each descendant state is one of the following: a following state D in a transition whose preceding state is state S, a following state D' in a transition whose preceding state is state D, etc. Similarly, a state S may have one or more ancestor states. Each ancestor state is one of the following: a preceding state A in a transition whose following state is state S, a preceding state A' in a transition whose following state is state A, etc. In addition, sibling states are states that are following states in transitions with a common preceding state. For example, states J and J' are sibling states if transition T includes state X as a preceding state and state J as a following state, and transition T' includes state X as a preceding state and state J' as a following state.

The states (160) correspond to paths (164). Each path (164) includes a sequence of transitions ending with the corresponding state and beginning with a start state of the finite automaton (116). The paths (164) optionally correspond to path types (166). Examples of path types include: positive, negative, and conflicting. Continuing this example, a positive path includes states whose labeled descendant states all have positive polarity. In FIG. 4B, the path from state $q_0$ to state $q_1$ to state $q_7$ is a positive path because all labeled descendant states have positive polarity. Similarly, a negative path includes states whose labeled descendant states all have negative polarity. In FIG. 4B, the path from state $q_0$ to state $q_1$ to state $q_9$ is a negative path because all labeled descendant states have negative polarity. Finally, a conflicting path includes states whose labeled descendant states include at least one state with positive polarity and at least one state with negative polarity. In FIG. 4B, the path from state $q_0$ to state $q_1$ to state $q_6$ is a conflicting path because at least one of the labeled descendant states has positive polarity and at least one of the labeled descendant states has negative polarity.

Returning to FIG. 1C, a state mapping (118) includes tracked states (176S, 176Y) corresponding to states (160S, 160Y). The tracked states (176S) include one or more descendant states of the corresponding state (160S). The state mapping (118) may be used by the deserialization filter generator (108) to track which states to examine during a recursive traversal of the states (160) of the finite automaton (116).

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to execute code (130) to generate a deserialization example (112K). The deserialization example (112K) may be a candidate for deserialization (i.e., reconstructing an object from deserialization example (112K)). The code (130) is a collection of statements (e.g., computer instructions) written in source code of a human-readable programming language. As an example, the code (130) may perform a static analysis or dynamic analysis of an application program. The user computing system (102) includes functionality to send the deserialization example (112K) to the deserialization filter generator (108).

Returning to FIG. 1A, the deserialization filter generator (108) includes functionality to generate a finite automaton (116) from deserialization examples (112D, 112X). The deserialization filter generator (108) includes functionality to generate a regular expression (124) while traversing the states of the finite automaton (116). The regular expression (124) is a sequence of characters that defines a pattern that describes the deserialization examples (112D, 112X). For example, the regular expression (124) may define whether a numeric sequence follows an alphabetic sequence, a number of characters in each sequence, etc. The deserialization filter generator (108) includes functionality to determine a polarity (114K) for a deserialization example (112K) using the regular expression (124). The deserialization filter generator (108) includes functionality to send the polarity (114K) to the user computing system (102).

In one or more embodiments, the computer processor(s) (110) takes the form of the computer processor(s) (502)

described with respect to FIG. 5A and the accompanying description below. In one or more embodiments, the computer processor (110) includes functionality to execute the deserialization filter generator (108).

While FIG. 1A shows a configuration of components, other configurations may be used without departing from the scope of the invention. For example, various components may be combined to create a single component. As another example, the functionality performed by a single component may be performed by two or more components.

Figure 2:
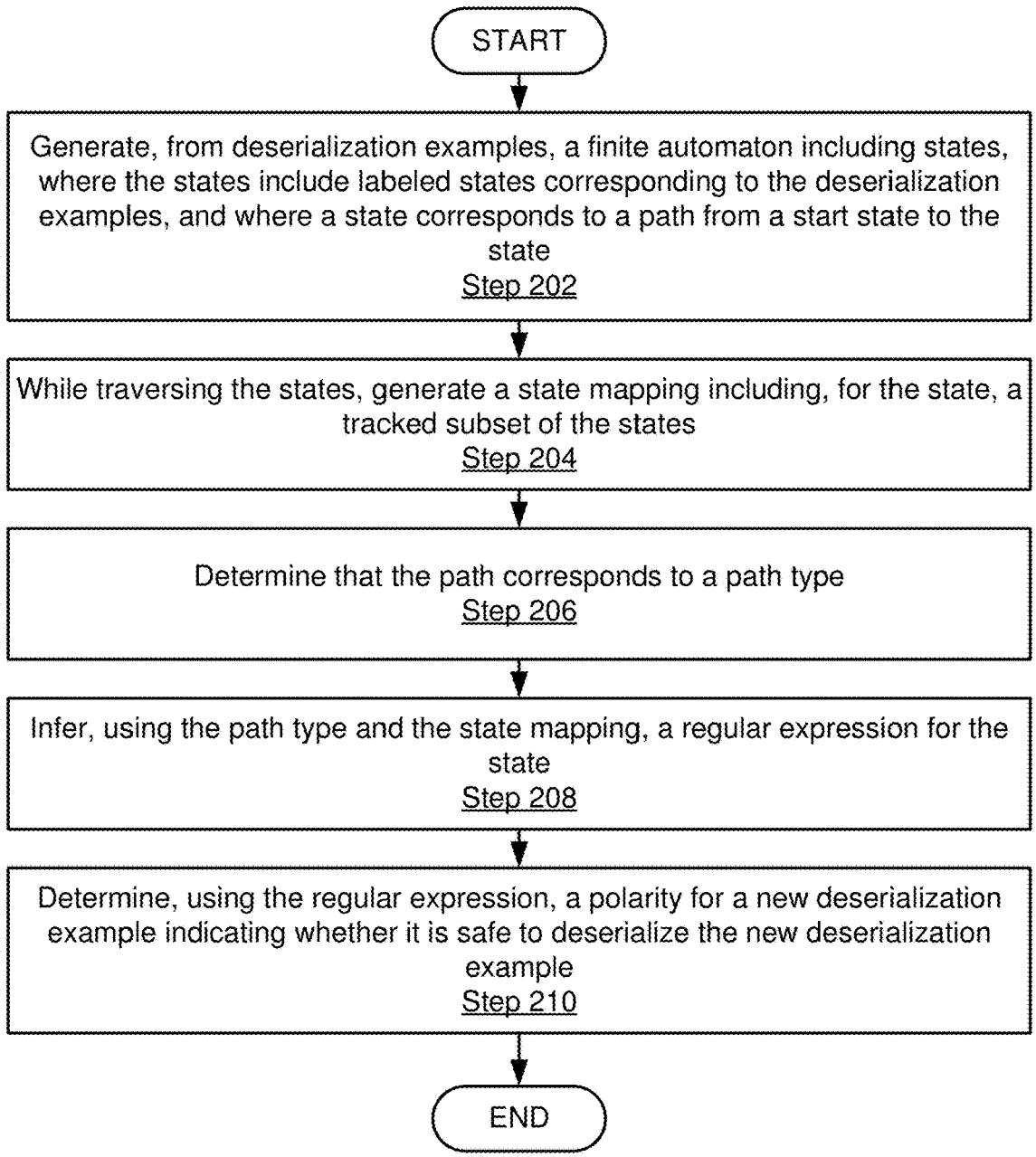
FIG. 2 and FIG. 3 show flowcharts in accordance with one or more embodiments of the invention.

FIG. 2 shows a flowchart in accordance with one or more embodiments of the invention. The flowchart depicts a process for detecting malicious code. One or more of the steps in FIG. 2 may be performed by the components (e.g., the deserialization filter generator (108) of the back-end computing system (104) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a finite automaton is generated from deserialization examples. The deserialization filter generator may obtain the deserialization examples from a repository. The deserialization filter generator may generate the finite automaton as follows:

1) adding states corresponding to sub-package names and class names of the deserialization examples. For example, FIG. 4B shows an augmented prefix tree acceptor (APTA) (410A) that includes states corresponding to sub-package names and class names of deserialization examples (400, 402) shown in FIG. 4A. Continuing this example, FIG. 4B shows a state $q_1$ corresponding to the sub-package name "java" and states $q_2$, $q_4$, and $q_3$ corresponding to the class names "char," "byte," and "int," respectively.

2) adding transitions corresponding to sub-package names and class names of the deserialization examples. For example, FIG. 4B shows an APTA (410A) that includes transitions whose input strings are sub-package names and class names of deserialization examples (400, 402) shown in FIG. 4A. Continuing this example, FIG. 4B shows a transition labeled with the sub-package name "java" connecting states $q_0$ and $q_1$. FIG. 4B also shows transitions labeled with the class names "char," "byte," and "int," connecting states $q_0$ and $q_2$, states $q_0$ and $q_4$, and states $q_0$ and $q_3$, respectively.

In Step 204, a state mapping including, for the state, a tracked subset of states is generated while traversing the states. The deserialization filter generator examines each state and performs a different operation depending on whether the state is an internal state or a labeled state. The tracked subset of states for each state indicates which descendant states of the state are to be examined as the deserialization filter generator recursively traverses the states.

When the deserialization filter generator reaches an internal state, the deserialization filter generator determines whether the internal state has any descendant states labeled with a negative polarity. If the internal state has at least one descendant state labeled with a positive polarity, and the internal state has no descendant states labeled with a negative polarity, then the deserialization filter generator generates a mapping of the internal state to the empty state. By mapping the internal state to the empty state, the deserialization filter generator indicates that no further traversal of the descendant states of the internal state is needed.

Alternatively, if the internal state has at least one descendant state labeled with a negative polarity, then the deserialization filter generator recursively traverses states that are following states of the internal state in transitions of the finite automaton whose preceding state is the internal state. While traversing such following states, if the deserialization filter generator traverses to a labeled state L without finding at least one descendant state of the respective following state labeled with a positive polarity, then the deserialization filter generator adds an entry in the state mapping from a state A to state L, such that 1) state A is an ancestor state of state L, and 2) state A is included in a longest path whose path type is not positive (i.e., whose path type is conflicting or negative). For example, see descriptions of FIG. 4B, FIG. 4C, and FIG. 4D below.

In Step 206, it is determined that the path corresponds to a path type. The deserialization filter generator determines the path type of a path by examining the descendant labeled states of the state corresponding to the path. If the descendant labeled states all have a positive polarity, then the path type is positive. If the descendant labeled states all have a negative polarity, then the path type is negative. If one or more of the descendant labeled states have a positive polarity, and one or more of the descendant labeled states have a negative polarity, then the path type is conflicting. For example, when a path type is conflicting, then there are both positive deserialization examples and negative deserialization examples in the package corresponding to the path.

In Step 208, a regular expression is inferred for the state using the path type and the state mapping. When the path type is positive, then the deserialization filter generator infers the regular expression by appending a Kleene star closure.* to the path. When the path type is conflicting, then the deserialization filter generator infers the regular expression by applying a conflict resolution heuristic. When the conflict resolution heuristic is "AllowList," the deserialization filter generator infers the regular expression as the union of paths to the descendant states of the state that are labeled with a positive polarity. For example, given positive paths A and B and negative paths C and D (e.g., where paths A, B, C, and D correspond to class names), applying the AllowList heuristic produces (A | B). When the conflict resolution heuristic is BlockList, then the deserialization filter generator infers a regular expression that matches any path except for negative examples using zero-width negative lookahead followed by the class name level catch-all expression (\.[.]+). The negative lookahead feature of regular expressions allows a match to a first pattern when the first pattern is not followed by a second pattern. For the above example, applying the BlockList heuristic produces (?!(C|D)$)[^.]+. When the conflict resolution heuristic is Inference, then the deserialization filter generator uses a well-known inference algorithm (e.g., BlueFringe) to infer a regular expression from an APTA generated from class names.

The deserialization filter generator then generates a final regular expression by combining the regular expressions inferred for the states in the state mapping. For example, the deserialization filter generator may generate a final regular expression as the union of the regular expressions inferred for the states in the state mapping.

In Step 210, a polarity is determined for a new deserialization example using the regular expression. The polarity indicates whether it is safe to deserialize the new deserialization example. The new deserialization example may be a candidate for deserialization (i.e., reconstructing an object from the new deserialization example). The new deserialization example may be generated while executing code.

Alternatively, the new deserialization example may be generated during a static analysis of code (e.g., a static analysis of a third-party library).

The deserialization filter generator determines the polarity for the new deserialization example by applying the regular expression inferred in Step 208 above to the new deserialization example. If the regular expression matches the new deserialization example, then the polarity for the new deserialization example is positive. If the regular expression fails to match the new deserialization example, then the polarity for the new deserialization example is negative. Thus, the regular expression inferred in Step 208 above functions as a deserialization filter for new deserialization examples.

Figure 3:
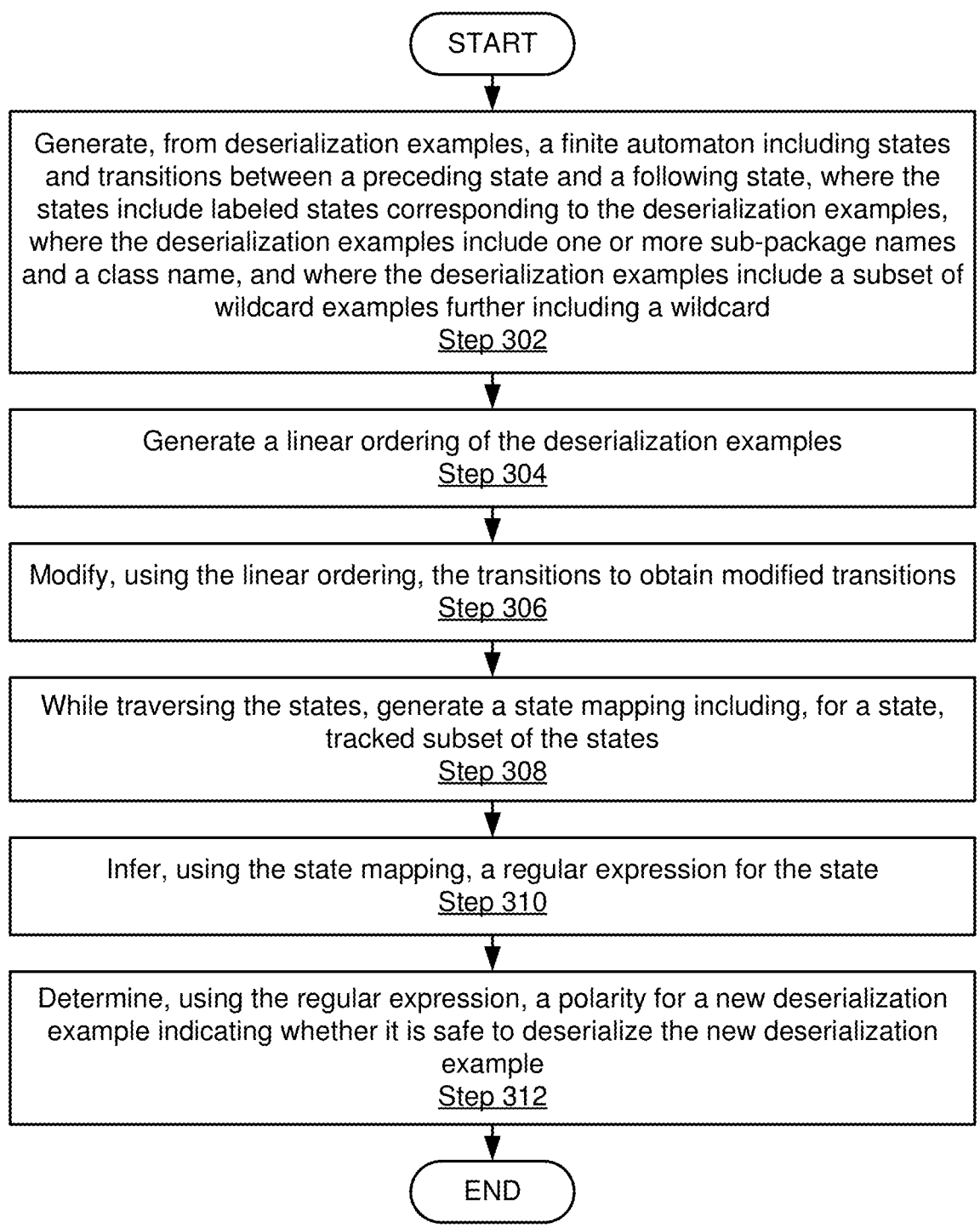

FIG. 3 shows a flowchart in accordance with one or more embodiments of the invention. The flowchart depicts a process for detecting malicious code. One or more of the steps in FIG. 3 may be performed by the components (e.g., the deserialization filter generator (108) of the back-end computing system (104) and/or the user computing system (102), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, a finite automaton is generated from deserialization examples (see description of Step 202 above). The deserialization examples include a subset of wildcard deserialization examples that include a wildcard.

In Step 304, a linear ordering of the deserialization examples is generated. The deserialization filter generator generates the linear ordering in response to determining that the wildcard deserialization examples include at least one pair of overlapping deserialization examples. The deserialization filter generator resolves multiple interpretations of overlapping deserialization examples by arranging the overlapping deserialization examples into the linear ordering. The linear ordering arranges the overlapping deserialization examples into a sequence such that each successive overlapping deserialization example in the sequence is a subset of the previous overlapping deserialization example in the sequence. The sequence of deserialization examples in the linear ordering has alternating polarity. For example, if a deserialization example $D_i$ in the linear ordering has a positive polarity, then the next deserialization example $D_{i+1}$ in the linear ordering has a negative polarity.

For example, positive deserialization examples may include a. and a.b.c. and negative deserialization examples may include a.b. and a.b.c.d. The deserialization filter generator may generate the following linear ordering for the above deserialization examples, because a. includes all concrete deserialization examples from a.b.**, and so on.

$$a. \supset a.b. \supset a.b.c.** \supset a.b.c.d$$

The deserialization filter generator may use the linear ordering to construct the following set that describes only positive examples to be used in the generation of a regular expression for the deserialization examples, where the \ symbol indicates set subtraction.

$$(a.\backslash a.b.) \cup (a.b.c.**\backslash a.b.c.d)$$

If the polarities of the above deserialization examples are reversed, then the set of deserialization examples becomes:

$$(a.b.\backslash a.b.c.) \cup a.b.c.d$$

In general, the linear ordering of overlapping deserialization examples is of the form shown below, where the rightmost deserialization example $E_N$ may be a concrete deserialization example, and where deserialization examples $E_1, E_2, \ldots E_{N-1}$ include wildcards.

$$E_1 \supset E_2 \supset E_3 \supset \ldots \supset E_N$$

Let P and N denote a set of positive deserialization examples and a set of negative deserialization examples, respectively. The deserialization filter generator may exclude linear orderings with consecutive positive or negative deserialization examples. For example, consecutive positive deserialization examples $P_1 \supset P_2$ may be simplified to $P_1$. Furthermore, because positive deserialization examples for N \P may be simplified to P, then a linear ordering of the form $N_1 \supset P_1 \supset N_2$ may be simplified to $P_1 \supset N_2$. The remaining case is thus $P_1 \supset N_1 \supset P_2 \supset \ldots$ with positive deserialization examples represented as $(P_1 \backslash_1) \cup (P_2 \backslash N_2)$. Thus, translating positive wildcard deserialization examples to regular expressions (e.g., in Step 310 below) is straightforward. For example, the wildcard * may be translated to [^.]+, the wildcard ** may be translated to .*, and set subtraction may be expressed with negative lookahead.

In Step 306, the transitions are modified, using the linear ordering, to obtain modified transitions. Because overlapping deserialization examples describe the same concrete deserialization examples using different polarities, overlapping deserialization examples may not be represented directly in a finite automaton, such as an augmented prefix tree acceptor (APTA). The deserialization filter generator may transform the APTA generated from deserialization examples into an APTA where wildcard states corresponding to deserialization examples with ** wildcards are "raised" above sibling states. In addition, wildcard states corresponding to deserialization examples with * wildcards may be raised above sibling states that are leaf states, because the wildcard * is limited to describing class names, which correspond to leaf states. Raising a state S above a state S' that is a sibling state of state S is equivalent to adding a new transition whose preceding state is S and whose following state is S'.

Figure 4F:
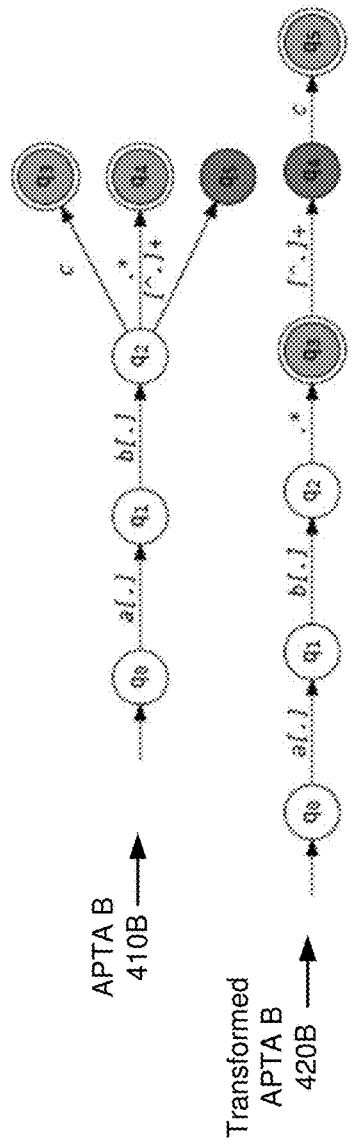
FIG. 4F, FIG. 4G, and FIG. 4H show examples in accordance with one or more embodiments of the invention.

An example of a raise transformation is shown in FIG. 4F, where APTA B (410B) has been constructed from deserialization examples. The labeled states in APTA B (410B) are sibling states, even though deserialization example a.b.** includes both deserialization examples a.b.* and a.b.c, and deserialization example a.b.* includes deserialization example a.b.c. In contrast, transformed APTA B (420B) in FIG. 4F shows the effect of applying a raise transformation that places a wildcard state before a state corresponding to a concrete deserialization example and before a wildcard state corresponding to a smaller wildcard deserialization example.

The deserialization filter generator may transform the APTA by adding a new transition whose preceding state corresponds to a wildcard deserialization example and whose following state is a state corresponding to a concrete deserialization example. Alternatively, the deserialization filter generator may transform the APTA by adding a new transition whose preceding state corresponds to a wildcard deserialization example W and whose following state is a state corresponding to a wildcard deserialization example W' that is smaller than wildcard deserialization example W (e.g., W' describes a subset of the deserialization examples described by W).

The deserialization filter generator may transform the APTA by applying a trim transformation that removes redundant consecutive labeled states in the same path that correspond to deserialization examples with the same polarity. That is, there are no intervening deserialization examples in the path between the consecutive labeled states with the opposite polarity.

Figure 4G:
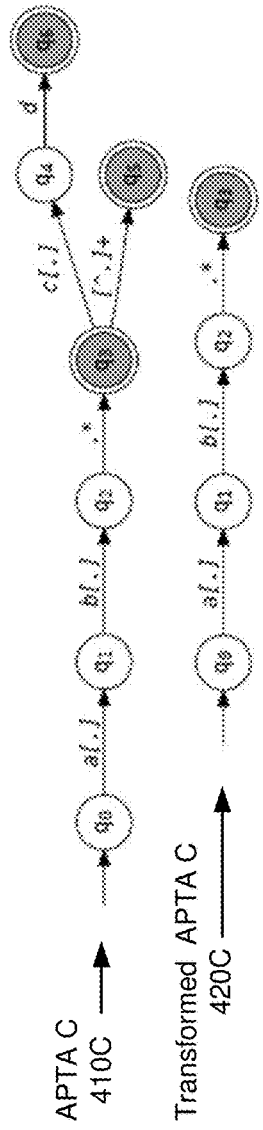

An example of a trim transformation is shown in FIG. 4G, where APTA C (410C) has been transformed into transformed APTA C (420C) by removing, redundant states $q_5$ and $q_6$ that have the same (positive) polarity as state $q_3$. The deserialization filter generator may apply the trim transformation after applying the raise transformation. The redundant states may be found by a recursive traversal that tracks the polarity of the most recently traversed labeled state.

After modifying the transitions of the APTA, the states of the APTA are linearly ordered in terms of superset-subset relationships, such that each successive state (e.g., a following state in a transition) describes a subset of the deserialization examples described by the previous state (e.g., a preceding state in the transition), thereby eliminating multiple interpretations due to overlapping wildcard deserialization examples.

In Step 308, a state mapping including, for a state, a tracked subset of states is generated while traversing the states (see description of Step 204 above). As the deserialization filter generator traverses the linearly ordered states in the APTA tree, the deserialization filter generator processes each positive wildcard state as follows.

1) mapping each positive wildcard leaf state to the empty state because a leaf state has no descendant states that are candidates for tracking, and thus the positive wildcard leaf state has no negative labeled descendant states whose paths need to be considered (e.g., subtracted) in the inference of regular expressions in Step 310 below.

2) mapping each positive wildcard internal (e.g., non-leaf) state to negative labeled states later traversed on a path that includes the positive wildcard internal state. That is, the negative labeled states are descendant states of the positive wildcard internal state. When the deserialization filter generator traverses to each negative labeled state, the deserialization filter generator adds the pair <positive wildcard internal state, negative labeled state> to the state mapping. If the negative labeled state is an internal state, the deserialization filter generator traverses the descendant states of the negative labeled state to identify any additional positive wildcard states, as 1) above is repeated to map a sequence of positive wildcard states alternating with negative labeled states.

In Step 310, a regular expression is inferred for the state using the state mapping. Each pair <q, P> in the state mapping includes a positive wildcard state q and a set of negative wildcard states P. The deserialization filter generator infers a regular expression for each pair <q, P> as follows.

1) If the set P is empty, then the regular expression $R_q$ for q is the path from the start state to q, where the path excludes any wildcards due to transitions whose input string is a wildcard (i.e., the path excludes occurrences of the wildcards * and **).

2) If the set P is non-empty, the regular expression for each negative wildcard state w in P is the path from the start state to w, where the path excludes any wildcards due to transitions that include wildcards. The regular expressions for each negative wildcard state w in P are then subtracted from $R_q$ using negative lookahead.

The deserialization filter generator infers a final regular expression as the union of the regular expressions inferred in 1) and 2) above.

In Step 312, a polarity is determined for a new deserialization example using the regular expression (see description of Step 210 above).

FIG. 4A, FIG. 4B, FIG. 4C, FIG. 4D, FIG. 4E, FIG. 4F, FIG. 4G, and FIG. 4H show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

FIG. 4A shows deserialization examples (400, 402) ((112D, 112K, 112X) in FIG. 1A and (150) in FIG. 1B). The positive deserialization examples (400) have a positive polarity and the negative deserialization examples (402) have a negative polarity. The positive deserialization examples (400) include deserialization examples (e.g., "int" and "char") that include a class name without including a sub-package name. The positive deserialization examples (400) also include deserialization examples (e.g., "java.lang.String," "java.lang.Short," etc.) that include multiple sub-package names and a class name. Similarly, the negative deserialization examples (402) include a deserialization example (e.g., "byte") that includes a class name without including a sub-package name. The negative deserialization examples (402) also include deserialization examples (e.g., "java.lang.Runtime," "java.lang.System," etc.) that include multiple sub-package names and a class name.

FIG. 4B shows augmented prefix tree acceptor (APTA) A (410A) ((116) in FIG. 1A and FIG. 1B) generated by the deserialization filter generator from the deserialization examples (400, 402) of FIG. 4A. APTA A (410A) includes states shown as circles (e.g., states $q_0$ thru $q_{24}$), and transitions shown as arrows. FIG. 4C shows transitions (420A, 420B, 420C, 420D) ((170T, 170W) in FIG. 1B) whose preceding state is the start state, $q_0$. In transition A (420A), the following state is $q_2$ and the input string is "char." State $q_2$ is a labeled state with positive polarity and corresponds to the positive deserialization example "char" of FIG. 4A. In transition B (420B), the following state is $q_1$ and the input string is "java[.]." State $q_1$ is an internal state (i.e., state $q_1$ is not a labeled state). In transition C (420C), the following state is $q_4$ and the input string is "byte." State $q_4$ is a labeled state with negative polarity and corresponds to the negative deserialization example "byte" of FIG. 4A. In transition D (420D), the following state is $q_3$ and the input string is "int." State $q_3$ is a labeled state with positive polarity and corresponds to the positive deserialization example "int" of FIG. 4A.

FIG. 4D shows a state mapping (422) ((118) in FIG. 1A and FIG. 1C) generated by the deserialization filter generator while traversing the states of APTA A (410A) of FIG. 4B. The deserialization filter generator first examines the start state, $q_0$. Because the descendant states of $q_0$ include labeled states labeled with a positive polarity and labeled states labeled with a negative polarity, the deserialization filter generator recursively traverses the immediate descendant states of state $q_0$ (i.e., states $q_1$, $q_2$, $q_3$, and $q_4$), where the immediate descendant states are following states in transitions whose preceding state is state $q_0$ (i.e., transitions (420A, 420B, 420C, 420D) of FIG. 4C). States $q_2$, $q_3$, and $q_4$ are labeled states (e.g., leaf states) that have no descendant states, and thus states $q_2$, $q_3$, and $q_4$ are tracked states corresponding to $q_0$ in the state mapping (422). State $q_1$ corresponds to a path whose path type is conflicting, and thus the descendants of state $q_1$ are processed recursively because state $q_1$ has at least one descendant state labeled with a negative polarity. Because state $q_1$ corresponds to a path whose path type is positive, the state mapping (422) maps state $q_1$ to the empty set. The deserialization filter generator then recursively processes states $q_5$, $q_6$, $q_8$, $q_9$, and $q_{20}$. Finally, the deserialization filter generator maps, in the state mapping (422), states $q_5$, $q_6$, $q_8$, and $q_9$ to their descendant labeled states (e.g., leaf states). Because state $q_{10}$ corresponds to a path whose path type is positive, the state mapping (422) maps state $q_{10}$ to the empty set.

FIG. 4E shows a regular expression (424) ((124) in FIG. 1A) inferred by the deserialization filter generator. The deserialization filter generator infers the regular expression (424) from the state mapping (422) as follows. Because the path java[.]util[.] corresponding to state $q_1$ has a positive path type, the deserialization filter generator infers a regular expression for state $q_1$ by adding a Kleene star closure the path, resulting in the regular expression java[.]util[.].*. Similarly, Because the path java[.]nio[.]files[.] corresponding to state $q_{10}$ has a positive path type, the deserialization filter generator infers a regular expression for state $q_{10}$ by adding a Kleene star closure the path, resulting in the regular expression java[.]nio[.]files[.].*. The paths corresponding to state $q_0$, $q_6$, and $q_8$ have a conflicting path type, and the deserialization filter generator infers corresponding regular expressions using a conflict resolution heuristic, in this case, the AllowList heuristic, resulting in the regular expressions char lint, java[.]lang[.](String|Short) and java[.]time[.](Instant|Clock). The paths corresponding to state $q_5$, $q_9$, and $q_{20}$ have a negative path type, and therefore do not contribute to the regular expression (424). The deserialization filter generator then forms the regular expression (424) by taking the union of the regular expressions generated for the paths corresponding to states $q_7$, $q_{10}$, $q_0$, $q_6$, and $q_8$.

As described earlier, FIG. 4F shows an example of applying a raise transformation to generate transformed APTA B (420B) from APTA B (410B) which was constructed from deserialization examples. The raise transformation places a wildcard state before a state corresponding to a concrete deserialization example and before a wildcard state corresponding to a smaller wildcard deserialization example. As described earlier, FIG. 4G shows an example of applying a trim transformation to generate transformed APTA C (420C) from APTA C (410C) by removing redundant states $q_5$ and $q_6$ that have the same (positive) polarity as state $q_3$.

Figure 4H:
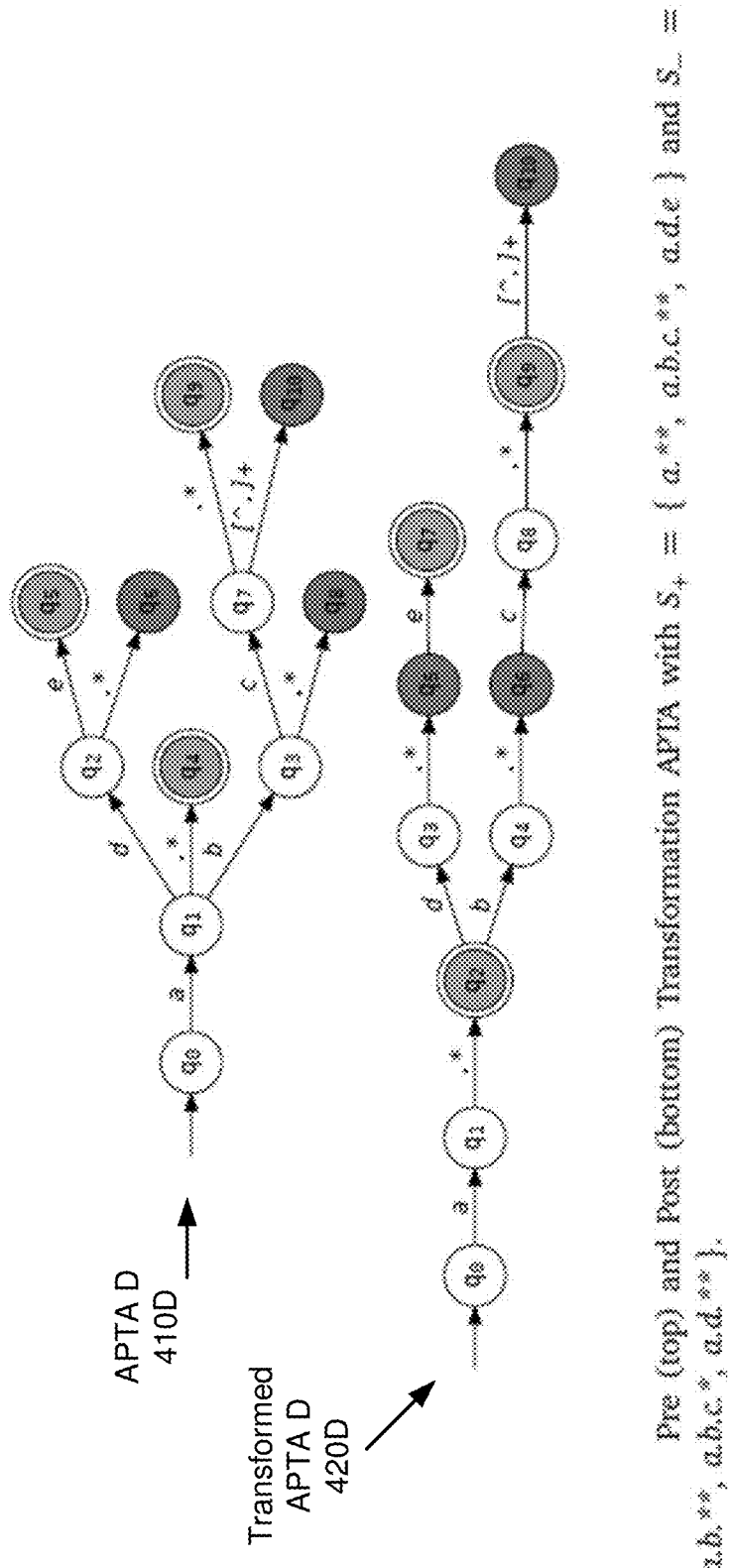

FIG. 4H shows APTA D (410D) generated by the deserialization filter generator from positive deserialization examples {a., a.b.c., a.d.e} and negative deserialization examples {a.b.**, a.b.c.*, a.d.**}. The deserialization filter generator generates transformed APTA D (420D) by applying raise and trim transformations. The deserialization filter generator begins traversal of the states of transformed APTA D (420D) and reaches positive wildcard state $q_2$. The deserialization filter generator then sets a wildcard context variable to $q_2$. Upon reaching negative wildcard state $q_5$, the deserialization filter generator adds the entry to $q_2 \rightarrow \{q_5\}$ to a state mapping, indicating that the positive deserialization examples include strings described by deserialization examples corresponding to state $q_2$, except negative deserialization examples corresponding to state $q_5$. The deserialization filter generator then reaches positive wildcard leaf state $q_1$ that is mapped to an empty state, because wildcard leaf state $q_1$ has no descendant states, and thus has no negative deserialization examples to subtract. The deserialization filter generator then traverses the bottom branch of transformed APTA D (420D) and adds $q_2 \rightarrow \{q_6\}$ and $q_9 \rightarrow \{q_{10}\}$ to the state mapping. The final state mapping is $\{q_2 \rightarrow \{q_5, q_6\}, q_7 \rightarrow \text{empty set}, q_9 \rightarrow \{q_{10}\}\}$. The deserialization filter generator then generates regular expressions from the entries of the state mapping, where:

$q_2 \rightarrow \{q_5, q_6\}$ is translated to a[.](?!(b[.]|d[.])).*$).*, $q_7 \rightarrow$ empty set is translated to a literal regular expression corresponding to the path (omitting wildcards) from the start state $q_0$ to $q_7$: (a[.]d[.]e), and $q_9 \rightarrow \{q_{10}\}$ is translated to a[.]b[.]c[.](?![^.]+$).*.

The final regular expression synthesized from the positive negative deserialization examples is then:

$$\hat{\ }a[.](?!(b[.]|d[.])).*\$).*|a[.]b[.]c[.](?![^.]+\$).*|a[.]d[.]e\$$$

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
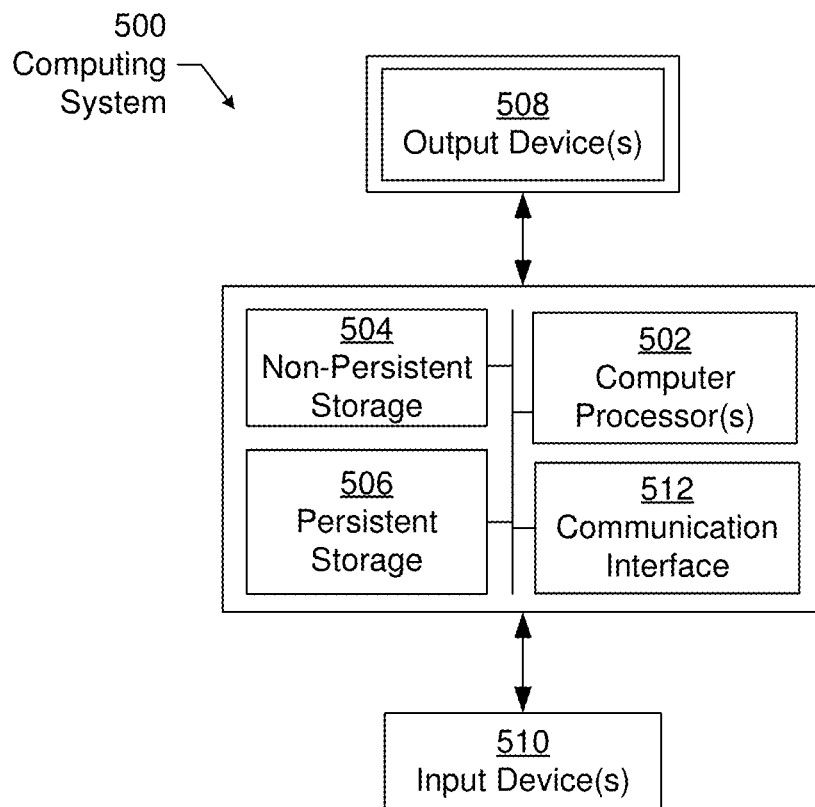
FIG. 5A and FIG. 5B show computing systems in accordance with one or more embodiments of the invention.
Figure 5B:
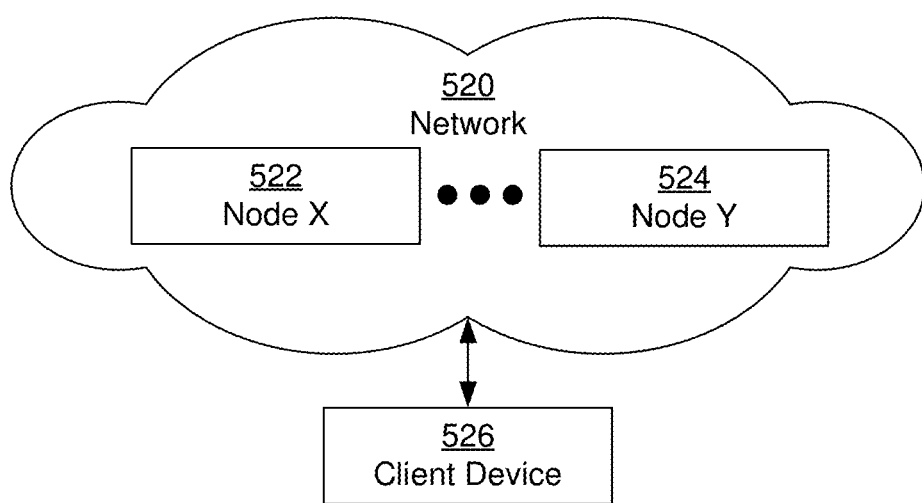

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting malicious code, comprising:
generating, from a plurality of deserialization examples corresponding to objects that were serialized into byte streams, a finite automaton comprising a plurality of states,
wherein the plurality of states comprises a plurality of labeled states corresponding to the plurality of deserialization examples, and
wherein a first state of the plurality of states corresponds to a first path from a start state to the first state;
while traversing the plurality of states, generating a state mapping comprising, for the first state, a first tracked subset of the plurality of states;
determining that the first path corresponds to a first path type of a plurality of path types;
inferring, using the first path type and the state mapping, a first regular expression for the first state; and
determining, for a new deserialization example and using the first regular expression, a first polarity indicating whether it is safe to deserialize the new deserialization example.

2. The method of claim 1,
wherein the plurality of deserialization examples are labeled with a second polarity,
wherein the plurality of labeled states are labeled with the second polarity of the corresponding deserialization example,
wherein the finite automaton further comprises transitions between a preceding state of the plurality of states and a following state of the plurality of states,
wherein the first path type is conflicting,
wherein the first state is an ancestor state of one of the plurality of labeled states labeled with a positive polarity and an ancestor state of one of the plurality of labeled states labeled with a negative polarity, and
wherein inferring the first regular expression for the first state comprises applying a conflict resolution heuristic.

3. The method of claim 2, wherein applying the conflict resolution heuristic comprises combining regular expressions corresponding to class names of the plurality of labeled states labeled with a positive polarity that are descendant states of the first state.

4. The method of claim 2, wherein applying the conflict resolution heuristic comprises excluding regular expressions corresponding to class names of the plurality of labeled states labeled with a negative polarity that are descendant states of the first state.

5. The method of claim 1, wherein a second state of the plurality of states corresponds to a second path from the start state to the second state, and wherein the state mapping further comprises, for a second state of the plurality of states, a second tracked subset of the plurality of states, the method further comprising:

determining that the second path corresponds to a second path type of the plurality of path types;
inferring, using the second path type and the state mapping, a second regular expression for the second state; and
modifying the first regular expression by combining the first regular expression with the second regular expression,
wherein the first polarity is determined after modifying the first regular expression.

6. The method of claim 5,
wherein the plurality of deserialization examples are labeled with a second polarity,
wherein the plurality of labeled states are labeled with the second polarity of the corresponding deserialization example,
wherein the finite automaton further comprises transitions between a preceding state of the plurality of states and a following state of the plurality of states,
wherein the second path type is positive,
wherein the second state is an ancestor state of a labeled state of the plurality of labeled states labeled with a positive polarity and is not an ancestor state of any of the plurality of labeled states labeled with a negative polarity, and
wherein inferring the second regular expression for the second state comprises adding a Kleene star closure to the class name corresponding to the labeled state labeled with the positive polarity.

7. A system for detecting malicious code, comprising:
a computer processor;
a repository configured to store:
a plurality of deserialization examples corresponding to objects that were serialized into byte streams,
a finite automaton comprising a plurality of states,
wherein the plurality of states comprises a plurality of labeled states corresponding to the plurality of deserialization examples, and
wherein a first state of the plurality of states corresponds to a first path from a start state to the first state, and
a state mapping comprising, for a first state of the plurality of states, a first tracked subset of the plurality of states; and
a deserialization filter generator executing on the computer processor and configured to:
generate, from the plurality of deserialization examples, the finite automaton,
while traversing the plurality of states, generate the state mapping,
determine that the first path corresponds to a first path type of a plurality of path types,
infer, using the first path type and the state mapping, a first regular expression for the first state, and
determine, for a new deserialization example and using the first regular expression, a first polarity indicating whether it is safe to deserialize the new deserialization example.

8. The system of claim 7,
wherein the plurality of deserialization examples are labeled with a second polarity,
wherein the plurality of labeled states are labeled with the second polarity of the corresponding deserialization example,
wherein the finite automaton further comprises transitions between a preceding state of the plurality of states and a following state of the plurality of states, wherein the first path type is conflicting,
wherein the first state is an ancestor state of one of the plurality of labeled states labeled with a positive polarity and an ancestor state of one of the plurality of labeled states labeled with a negative polarity, and
wherein the deserialization filter generator is further configured to infer the first regular expression for the first state by applying a conflict resolution heuristic.

9. The system of claim 8, wherein the deserialization filter generator applies the conflict resolution heuristic by combining regular expressions corresponding to class names of the plurality of labeled states labeled with a positive polarity that are descendants of the first state.

10. The system of claim 8, wherein the deserialization filter generator applies the conflict resolution heuristic by excluding regular expressions corresponding to class names of the plurality of labeled states labeled with a negative polarity that are descendants of the first state.

11. The system of claim 7, wherein the plurality of deserialization examples comprise one or more sub-package names and a class name, wherein the plurality of deserialization examples comprises a subset of wildcard deserialization examples further comprising a wildcard, and wherein the deserialization filter generator is further configured to:
generate a linear ordering of the plurality of deserialization examples, and
modify, using the linear ordering, the plurality of transitions to obtain a modified plurality of transitions, wherein the deserialization filter generator traverses the plurality of states using the modified plurality of transitions.

12. The system of claim 11, wherein the deserialization filter generator is further configured to:
determine that the plurality of deserialization examples comprises a pair of overlapping deserialization examples, wherein the linear ordering is generated in response to determining that the plurality of deserialization examples comprises the pair of overlapping deserialization examples, and
modify the plurality of transitions comprises by adding a transition whose preceding state is a wildcard state corresponding to one of the subset of wildcard deserialization examples.

13. The system of claim 11, wherein the plurality of labeled states comprises the first state and a second state, wherein the first state corresponds to a first path from a start state to the first state, wherein the second state corresponds to a second path from the start state to the second state, and wherein the deserialization filter generator is further configured to:
after modifying the plurality of transitions, make a first determination that the first state and the second state are comprised by a same path and are labeled with a same polarity,
make a second determination that the same path fails to comprise any state labeled with the same polarity and between the first state and the second state, and
in response to the first determination and the second determination, remove, from the modified plurality of transitions, a transition whose following state is a wildcard state corresponding to one of the subset of wildcard deserialization examples.

14. The system of claim 11, wherein the linear ordering comprises a sequence of deserialization examples with alternating polarity.

15. A method for detecting malicious code, comprising:
generating, from a plurality of deserialization examples corresponding to objects that were serialized into byte streams, a finite automaton comprising a plurality of states and a plurality of transitions each between a preceding state of the plurality of states and a following state of the plurality of states,
wherein the plurality of states comprises a plurality of labeled states corresponding to the plurality of deserialization examples,
wherein the plurality of deserialization examples comprise one or more sub-package names and a class name, and
wherein the plurality of deserialization examples comprises a subset of wildcard deserialization examples further comprising a wildcard;
generating a linear ordering of the plurality of deserialization examples;
modifying, using the linear ordering, the plurality of transitions to obtain a modified plurality of transitions;
while traversing the plurality of states, generating a first state mapping comprising, for a first state of the plurality of states, a first tracked subset of the plurality of states;
inferring, using the state mapping, a first regular expression for the first state; and
determining, using the first regular expression, a first polarity for a new deserialization example indicating whether it is safe to deserialize the new deserialization example.

16. The method of claim 15, wherein modifying the plurality of transitions comprises adding a transition whose preceding state is a wildcard state corresponding to one of the subset of wildcard deserialization examples.

17. The method of claim 15, further comprising:
determining that the plurality of deserialization examples comprises a pair of overlapping deserialization examples, wherein the linear ordering is generated in response to determining that the plurality of deserialization examples comprises the pair of overlapping deserialization examples.

18. The method of claim 17,
wherein the plurality of deserialization examples are labeled with a second polarity,
wherein the plurality of labeled states are labeled with the second polarity of the corresponding deserialization example,
wherein the first state mapping maps the first state to a second state,
wherein the pair of overlapping deserialization examples comprises a first example corresponding to the first state and labeled with a positive polarity and a second example corresponding to the second state and labeled with a negative polarity,
and wherein the method further comprises:
inferring a second regular expression for the second state, and
modifying the first regular expression by subtracting the second regular expression from the first regular expression,
wherein the first polarity is determined after modifying the first regular expression.

19. The method of claim 15, wherein the plurality of labeled states comprises the first state and a second state, wherein the first state corresponds to a first path from a start state to the first state, wherein the second state corresponds to a second path from the start state to the second state, the method further comprising:

after modifying the plurality of transitions, making a first determination that the first state and the second state are comprised by a same path and are labeled with a same polarity;

making a second determination that the same path fails to comprise any state labeled with the same polarity and between the first state and the second state, and in response to the first determination and the second determination, removing, from the modified plurality of transitions, a transition whose following state is a wildcard state corresponding to one of the subset of wildcard deserialization examples.

20. The method of claim 15, wherein the linear ordering comprises a sequence of deserialization examples with alternating polarity.

* * * * *

UNITED STATES PATENT AND TRADEMARK OFFICE
CERTIFICATE OF CORRECTION

| | |
|---|---|
| PATENT NO. | : 11,494,489 B1 |
| APPLICATION NO. | : 17/359245 |
| DATED | : November 8, 2022 |
| INVENTOR(S) | : Vorobyov et al. |

It is certified that error appears in the above-identified patent and that said Letters Patent is hereby corrected as shown below:

On the Title Page

Column 2, Item (56) under Other Publications, Line 6, delete "Intellence," and insert
-- Intelligence, --, therefor.

Column 2, Item (56) under Other Publications, Line 9, delete "Colloguium" and insert
-- Colloquium --, therefor.

On page 2, Column 1, Item (56) under Other Publications, Line 3, delete "Colloguium" and insert
-- Colloquium --, therefor.

On page 2, Column 2, Item (56) under Other Publications, Line 12, Delete "(45" and insert -- (15 --, therefor.

In the Specification

In Column 4, Line 25, delete "Java" and insert -- java --, therefor.

In Column 4, Line 30, after "wildcard" insert -- '*' --, therefor.

In Column 4, Lines 65-66, delete "⊂c a.b.." and insert -- ⊂a.b.. --, therefor.

In Column 8, Line 5, delete "automation" and insert -- automaton --, therefor.

In Column 8, Line 33, delete "closure.*" and insert -- closure .* --, therefor.

In Column 10, Line 15, delete "N \P" and insert -- N\P --, therefor.

In Column 10, Line 18, delete "$(P_1\backslash_1)$" and insert -- $(P_1\backslash N_1)$ --, therefor.

Signed and Sealed this
Sixth Day of June, 2023

*Katherine Kelly Vidal*

Katherine Kelly Vidal
*Director of the United States Patent and Trademark Office*

CERTIFICATE OF CORRECTION (continued)
U.S. Pat. No. 11,494,489 B1

In Column 13, Line 1, delete "$q_1$" and insert -- $q_7$ --, therefor.

In Column 13, Line 3, delete "$q_1$" and insert -- $q_7$ --, therefor.

In Column 13, Line 14, delete "$q_1$" and insert -- $q_7$ --, therefor.

In Column 13, Line 16, delete "$q_1$" and insert -- $q_7$ --, therefor.

In Column 13, Line 27, delete "char lint," and insert -- char|int, --, therefor.

In Column 13, Line 62, delete "$q_1$" and insert -- $q_7$ --, therefor.

In Column 13, Line 63, delete "$q_1$" and insert -- $q_7$ --, therefor.